Patented May 11, 1948

2,441,385

UNITED STATES PATENT OFFICE 2,441,385

MERCAPTAN RECOVERY

Richmond T. Bell, Highland Park, Ill., assignor to The Pure Oil Company, Chicago, Ill., a corporation of Ohio No Drawing. Application November 24, 1944, Serial No. 565,047

13 Claims. (Cl. 260—609)

This invention relates to the recovery of mercaptans from admixtures with hydrocarbons.

It is well known in the art to extract mercaptans from admixtures with hydrocarbons by means of alcoholic alkali solution, and to recover the mercaptans from the alcoholic alkali solution by boiling in the presence of water or by steam stripping in order to hydrolize the mercaptides to mercaptans and thus liberate them from the extraction solution.

Such methods for recovering mercaptans are satisfactory in the recovery of low-boiling mercaptans when they are present in comparatively dilute solution. Steam stripping, however, is not entirely satisfactory for recovering high-boiling mercaptans when present in high concentrations since such mercaptans are volatile only at high temperatures and therefore cannot be readily separated from the alcoholic alkali solution.

High-boiling mercaptans such as dodecyl mercaptans have found extensive use in the manufacture of synthetic rubber. One method of preparing high-boiling mercaptans is to react an olefin such as triisobutylene with hydrogen sulfide in the presence of a Friedel-Crafts catalyst such as anhydrous aluminum chloride, boron trifluoride and hydrogen borofluorides at temperatures of approximately 0 to 100° C. and at atmospheric or superatmospheric pressure. The olefins and the hydrogen sulfide combine to form mercaptans. At temperatures of approximately 25–50° C. and at pressures ranging from atmospheric to 200 lbs. per square inch, yields of mercaptans up to approximately 75% by weight on the basis of the olefins can be readily obtained by passing hydrogen sulfide through a body of the liquid olefin containing anhydrous aluminum chloride in suspension or solution, and by continuously agitating the body of triisobutylene during contact with hydrogen sulfide. The resulting product is separated from the catalytic sludge and is hydrolized with dilute hydrochloric acid in order to decompose any catalyst complex which may be contained therein, and after neutralization with aqueous alkali carbonate solution is extracted with methanol-alkali solution, as for example, a solution of sodium or potassium hydroxide in methanol. The extraction solution preferably contains as large an amount of alkali as is consistent with efficient extraction. Too high an alkali content results in extracting solutions of such high viscosity as to cause emulsion difficulties during extraction. For best results in this respect the alkali content should not exceed approximately 25% by weight of the solution. Good results in all respects are obtained with solutions containing 10–20% of caustic alkali. Methanol solutions of potassium hydroxide are superior to sodium hydroxide. Up to the point of emulsion difficulties, the yield of extracted mercaptans increases somewhat with increase in alkali content of the treating solution.

In order to obtain as high yields as possible of the mercaptan extract, the extracting solution should have a negligible water content, but in order to substantially reduce the amount of hydrocarbons and other substances extracted, the presence of water is advantageous. Since the yield of mercaptans in the extraction step decreases as the water content of the treating solution increases, the water concentration should not be so high as to appreciably decrease the mercaptan yield. Solutions containing 5–30% by weight of water are preferred, although solutions containing 0–50% of water may be used. Higher concentrations of alkali may be dissolved in solutions of greater water content.

The amount of methanol-alkali solution used in the extraction step should be such that the alkali content thereof is in excess of the stoichiometric quantity necessary to react with the mercaptans present in the material to be extracted. A small excess of alkali is sufficient. No harmful results are experienced from using a large excess except the loss of alkali in the subsequent neutralization step. The total volume of solvent is preferably at least approximately the volume of the material to be extracted, but may be greater or less, depending to a large extent on the mercaptan content of the material to be extracted and the alkali content of the solvent. Counter-current extraction is preferred, but batch extraction in at least two stages with the major portion of the solvent used in the first stage gives satisfactory results.

In order to recover the mercaptans from the resulting extract phase the extract, comprising the solution of alkali metal mercaptides in methanol is neutralized with acid. Upon neutralization mercaptans are formed as a layer above the aqueous methanol solution containing the alkali metal salt of the acid used for neutralization and can be separated by decantation.

Neutralization with the common mineral acids has two chief disadvantages—(1) a considerable amount of heat is generated requiring cooling of the mixture, and (2) salts are formed as a result of the neutralization which are not soluble in the aqueous layer unless sufficient water is added. The insoluble salts interfere with separation of the aqueous from the mercaptan layer. Since the alcohol must be recovered for reuse, dilution renders the recovery more expensive.

I have discovered that if the extract is neutralized with a low molecular weight monocarboxylic acid, such as formic or acetic acid, the heat of neutralization is far less than that experienced when neutralizing with mineral acids, and the salts formed as a result of the neutralization are highly soluble in the aqueous phase, requiring no dilution to obtain satisfactory separation of the mercaptan from the aqueous layer. Although I prefer to use formic or acetic acid in the neutralization of the extract phase monocarboxylic acids in general having up to and including 5 carbon atoms per molecule may be used.

In order to demonstrate the invention a number of extractions were made of a mercaptan-hydrocarbon mixture prepared by reacting crude triisobutylene polymer with hydrogen sulfide in the presence of aluminum chloride. In each case the solvent used was a solution of potassium hydroxide in methanol containing a small amount of water. Results of tests using sulfuric, formic, acetic and phosphoric acids in the neutralization step, are given in the following Table I:

not sufficient to interfere with handling of the material, nor was much cooling required. The yield of mercaptan obtained was up to expectations and the separation between the aqueous and the mercaptan layer was sharp. By washing the mercaptan layer with a small amount of water any residual salts and acid were removed. Before dilution of the sulfuric acid-neutralized extract a large quantity of insoluble salt was formed which changed the entire mixture to a semi-solid mass and required the addition of approximately 3 liters of water for complete solution of the salt and for clear separation between the layers.

In the case of phosphoric acid, upon addition of 375 grams of 25% acid—in excess of the quantity required to form $K_2HPO_4$ or $K_3PO_4$, but far insufficient to form $KH_2PO_4$—three liquid phases formed. Upon addition of 42 grams of 85% phosphoric acid—in large excess of the amount required to form $K_2HPO_4$ or $K_3PO_4$, but slightly less than the amount necessary to form $KH_2PO_4$—the three phases were reduced to two but a large quantity of salt precipitated which required the addition of about one liter of water for complete solution in order to clearly separate the mercaptans.

Each of the extractions reported in the foregoing table was carried out in a separatory funnel and extraction was made in two steps using 80% of the methanol-alkali solution in the first step, and 20% in the second step. In this first step extraction the amount of potassium hydroxide present was slightly in excess of the amount required to react with all the mercaptan sulfur present.

Table I

| Run No | 1 | 2 | 3 | 4 | 5 |
|---|---|---|---|---|---|
| Gms. Charge | 650 | 467.0 | 311.3 | 311.3 | 311.3 |
| Wt. Per Cent of RSH Sulfur in Charge | 12.11 | 13.60 | 13.60 | 13.60 | 13.60 |
| Extraction Solvent Composition, Per Cent by Wt.: | | | | | |
| KOH | 24.4 | 35.8 | 24.4 | 24.4 | 24.4 |
| $H_2O$ | 3.6 | 5.3 | 3.6 | 3.6 | 3.6 |
| $CH_3OH$ | 72.0 | 58.9 | 72.0 | 72.0 | 72.0 |
| Gms. Extraction Solvent Used | 625.0 | 354.7 | 325.1 | 381.1 | 347.5 |
| Wt. Per cent Excess KOH in Total Solvent Used over RSH Sulfur in Charge Extracted | 3.1 | 20.0 | 17.0 | 37.0 | 20.0 |
| Acid Used for Neutralization of Extracted Charge | $H_2SO_4$ | $CH_3COOH$ | $CH_3COOH$ | HCOOH | $H_3PO_4$ |
| Gms. Acid Used | 539 | 573 | 382 | 421 | (1) 375 |
|  |  |  |  |  | (2) 42 |
|  |  |  |  |  | (Total) 417 |
| Composition of Acid (Per cent by Wt.): | | | | | |
| Acid | 25 | 25 | 25 | 25 | 25–85 |
| $H_2O$ | 75 | 75 | 75 | 75 | 75–15 |
| Excess Acid Used (Per cent by Wt.) | 1.1 | 5.3 | 12.4 | 38.1 |  |
| $H_2O$ Dilution in Liters Required for Separation | 3 | 0 | 0 | 0 | 1 |
| Recovery, Wt. Per cent of Charge: | | | | | |
| Raffinate | 31.0 | 23.5 | 34.6 | 29.7 | 34.6 |
| Extract | 63.8 | 72.9 | 60.2 | 65.6 | 60.0 |
| Loss | 5.2 | 3.5 | 5.2 | 4.7 | 5.4 |
| Wt. Per cent RSH Sulfur in: | | | | | |
| Raffinate | 3.72 | 2.76 | 4.16 | 2.53 | 3.67 |
| Extract | 14.90 | 15.56 | 17.79 | 17.32 | 18.17 |
| Wt. Ratio of Acid and Water to Solvent | 5.66 |  | 1.17 | 1.10 | 4.10 |

By reference to the table it will be seen that in the case of sulfuric acid a high degree of dilution was necessary in order to effect a clear separation between the aqueous layer and the mercaptan layer, whereas acetic acid and formic acid require no dilution whatsoever over and above the acid used for neutralization. Also during the sulfuric acid neutralization the vessel in which the neutralization was conducted became too hot to handle and required constant cooling, whereas the heat generated during neutralization with acetic and formic acids was In neutralization of the caustic methanol extracts an excess of acid over that necessary to react with the potassium present was used. After neutralization with acid the extract was washed with water until neutral and then filtered to remove moisture. Further purification and isolation of dodecyl mercaptans was accomplished by vacuum fractionation of the extract.

The mercaptans prepared in accordance with the foregoing process were tested and the results were compared with values for pure dodecyl mercaptans. Comparative data are set forth in the following Table II:

|  | Experimental Dodecyl Mercaptans | Pure Dodecyl Mercaptans |
|---|---|---|
| Mercaptan Sulfur, wt. per cent | 14.2 | 15.8. |
| Total Sulfur, wt. per cent | 15.2 | 15.8. |
| Molecular Wt | 190 | 202. |
| Color | Colorless | Colorless. |
| Boiling Range, ° C. (Converted to 760 mm.) | 233-285 | 225-273. |

The mercaptan product compares favorably with pure dodecyl mercaptans, and meets the usual specifications required for commercial dodecyl mercaptans as used in synthetic rubber production.

Although ethanol-alkali solutions may be used in the extraction step, methanol-alcohol solutions are superior for the purposes of this invention.

It will be seen, therefore, that I have succeeded in providing a method for recovering high-boiling mercaptans from admixtures with hydrocarbons in which the mercaptans are present in high concentrations.

It is claimed:

1. In the recovery of mercaptans from the group consisting of methanol- and ethanol-alkali solutions the step comprising neutralizing the solution with a low molecular weight monocarboxylic acid.

2. The step in accordance with claim 1 in which the acid is selected from the group consisting of monocarboxylic acids having from 1 to 5 carbon atoms in the molecule.

3. The step in accordance with claim 1 in which the acid is formic acid.

4. The step in accordance with claim 1 in which the acid is acetic acid.

5. The process of recovering mercaptans from a mixture of mercaptans and hydrocarbons comprising separating the mercaptans from the hydrocarbons by extraction with methanol-alkali solution and neutralizing the extract solution with a low molecular weight monocarboxylic acid in the presence of sufficient solvent to dissolve the salt formed as a result of neutralization, thereby to cause the mercaptans to separate from the solution to form a second phase.

6. The process in accordance with claim 5 in which the acid is formic acid.

7. The process in accordance with claim 5 in which the acid is acetic acid.

8. The process of separating mercaptans containing at least 12 carbon atoms in the molecule from admixtures with olefinic hydrocarbons comprising extracting the mercaptans from the mixture by means of a solution of potassium hydroxide in water and methanol in an amount such that the potassium hydroxide is present in excess of the amount necessary to react with the entire mercaptan content of the mixture, separating the extract phase and mixing with the resulting extract phase sufficient low molecular weight monocarboxylic acid to react with all the potassium present and sufficient solvent to dissolve the salts formed in the reaction, thereby to cause the mercaptans to separate from the solution to form a second phase.

9. Process in accordance with claim 8 in which the methanol solution contains approximately 10 to 25% by weight of potassium hydroxide and approximately 5-30% by weight of water.

10. Process in accordance with claim 8 in which the acid is formic acid.

11. Process in accordance with claim 8 in which the acid is acetic acid.

12. Process in accordance with claim 5 in which the solvent is water.

13. Process in accordance with claim 8 in which the solvent is water.

RICHMOND T. BELL.

REFERENCES CITED

The following references are of record in the file of this patent:

UNITED STATES PATENTS

| Number | Name | Date |
|---|---|---|
| 2,013,203 | Davis | Sept. 3, 1935 |
| 2,309,652 | Leum | Feb. 2, 1943 |
| 2,309,654 | Leum | Feb. 2, 1943 |

OTHER REFERENCES

Kalichevsky, "Chemical Refining of Petroleum," of Reinhold, N. Y., 1942, pages 220-222. (Copy in Division 31.)